(12) United States Patent
Li (10) Patent No.: US 12,124,974 B2
(45) Date of Patent: Oct. 22, 2024

(54) METHOD, APPARATUS AND STORAGE MEDIUM FOR VEHICLE REQUESTS AND ROOF-LIGHT DISPLAY MANAGEMENT

(71) Applicant: Zhejiang Geely Holding Group Co., Ltd., Hangzhou (CN)

(72) Inventor: Shufu Li, Hangzhou (CN)

(73) Assignee: Zhejiang Geely Holding Group Co., Ltd., Hangzhou (CN)

( * ) Notice: Subject to any disclaimer, the term of this patent is extended or adjusted under 35 U.S.C. 154(b) by 0 days.

(21) Appl. No.: 18/277,781

(22) PCT Filed: Apr. 28, 2022

(86) PCT No.: PCT/CN2022/089961
§ 371 (c)(1),
(2) Date: Aug. 18, 2023

(87) PCT Pub. No.: WO2022/247580
PCT Pub. Date: Dec. 1, 2022

(65) Prior Publication Data
US 2024/0127129 A1   Apr. 18, 2024

(30) Foreign Application Priority Data

May 27, 2021  (CN) .......................... 202110585719.6

(51) Int. Cl.
*G06Q 50/47* (2024.01)
*B60Q 1/26* (2006.01)
(Continued)

(52) U.S. Cl.
CPC ........... *G06Q 10/02* (2013.01); *B60Q 1/2611* (2013.01); *G06Q 10/06315* (2013.01); *G06Q 50/47* (2024.01)

(58) Field of Classification Search
CPC ..................................................... G06Q 50/04
See application file for complete search history.

(56) References Cited

U.S. PATENT DOCUMENTS

2011/0307282 A1* 12/2011 Camp .................... G06Q 50/40
705/30
2015/0161564 A1* 6/2015 Sweeney .......... G06Q 10/08355
705/338
(Continued)

FOREIGN PATENT DOCUMENTS

CN    107122836 A    9/2017
CN    108171961 A    6/2018
(Continued)

OTHER PUBLICATIONS

Tarantal, Erika; "Free, In Use or Off-Duty? Confusing Taxi Light System May Get Makeover"; NBC NY; Oct. 12, 2011; https://www.nbcnewyork.com/news/local/taxi-cab-light-system-free-vacant-off-duty-confusing-fares-hail-cab-taxi-limousine-commission-tlc-makeover/1930821/ (Year: 2011).*

(Continued)

*Primary Examiner* — Rupangini Singh
*Assistant Examiner* — David G. Godbold
(74) *Attorney, Agent, or Firm* — Andrew C. Cheng (57) ABSTRACT

The present application relates to the technical field of cruising taxis and online appointment vehicles, and in particular relates to an order processing method and apparatus, a server and a storage medium. The method includes: receiving an order request sent by a user, the order request including information of a requested vehicle model set by the user; selecting a target vehicle according to the order request so as to send order distribution information; and if the requested vehicle model set by the user is an online appointment vehicle model, sending an operating state change instruction to the target vehicle. According to the order processing method not only avoids the order acceptance and dropping behavior of cruising taxi drivers and ensures that the user may travel conveniently, but also (Continued)

ensures that the vehicle that accepts the order may meet user demands, improving the user experience.

14 Claims, 5 Drawing Sheets

(51) Int. Cl.
   *G06Q 10/02* (2012.01)
   *G06Q 10/0631* (2023.01)

(56) References Cited

U.S. PATENT DOCUMENTS

| | | | | |
|---|---|---|---|---|
| 2015/0332425 A1* | 11/2015 | Kalanick | ................ | G06Q 50/40 |
| | | | | 705/13 |
| 2018/0341964 A1* | 11/2018 | Madhow | ............ | G06Q 30/0205 |
| 2019/0094884 A1* | 3/2019 | Aitken | ................ | G01C 21/3438 |
| 2020/0004341 A1* | 1/2020 | Li | ............................ | B60Q 1/507 |
| 2020/0173795 A1 | 6/2020 | Hardee | | |
| 2020/0314593 A1* | 10/2020 | Xu | ......................... | G06N 20/00 |
| 2021/0056874 A1* | 2/2021 | Morin | ................. | H04M 1/0268 |
| 2021/0233442 A1* | 7/2021 | DeLorean | ............... | G09F 21/04 |

FOREIGN PATENT DOCUMENTS

| | | |
|---|---|---|
| CN | 110543960 A | 12/2019 |
| CN | 111243110 A | 6/2020 |
| CN | 111445287 A | 7/2020 |
| CN | 111523690 A | 8/2020 |
| CN | 111526170 A | 8/2020 |
| CN | 111724239 A | 9/2020 |
| CN | 111754796 A | 10/2020 |
| CN | 113393003 A | 9/2021 |

OTHER PUBLICATIONS

The search report of CN application No. 202110585719.6 issued on Jun. 23, 2022.
International Search Report of PCT Patent Application No. PCT/CN2022/089961 issued on Jul. 8, 2022.

* cited by examiner

METHOD, APPARATUS AND STORAGE MEDIUM FOR VEHICLE REQUESTS AND ROOF-LIGHT DISPLAY MANAGEMENT

CROSS REFERENCE TO RELATED APPLICATIONS

The present disclosure is the national phase of International Patent Application No. PCT/CN2022/089961, filed on Apr. 28, 2022, which claims priority to Chinese Patent Application No. 202110585719.6, filed on May 27, 2021. All of the aforementioned patent applications are hereby incorporated by reference in their entireties.

TECHNICAL FIELD

The present application relates to the technical field of cruising taxis and online appointment vehicle appointment, in particular to an order processing method, apparatus, server and storage medium.

BACKGROUND TECHNIQUE

The cruising taxi is a component of urban comprehensive transportation system. Take the responsibility of supplementing urban public transportation capacity, providing personalized transportation services to the public. In recent years, with the rapid development of the mobile internet industry, new business formats in the industry integrating traditional transportation and the internet are booming, online appointment vehicle has become an important way for users to travel. In order to actively and steadily advance the reform of the taxi industry, encourage innovation, promote transformation, to better meet the travel needs of the people, the "Guiding Opinions of the General Office of the State Council on Deepening Reform and Promoting the Healthy Development of the Taxi Industry" pointed out that seize the favorable opportunity to implement the "Internet+" action, adhere to the problem-oriented approach, and promote the transformation and upgrading of cruising taxis, standardize online appointment vehicle operations, and promote the integrated development of the two business formats.

In the prior art, the traditional cruising taxi adopts some online appointment vehicle platforms to accept the online vehicle appointment order, but the realization mode is only a change of the order accepting mode. The cruising taxis do not completely replace online appointment vehicles in some scenarios, the cruising taxi cannot meet the needs of users who need real online appointment vehicle. The existing online appointment vehicle does not have the capability of receiving orders offline, so that the cruising taxi and the online appointment vehicle cannot be well fused, even the management of the cruising taxi and the online appointment vehicle is opposite to each other, and the transport capacity resource is wasted.

SUMMARY OF THE INVENTION

The invention solves the problem that the existing cruising taxi and the online appointment vehicle cannot be really integrated.

In order to solve the above technical problem, in a first aspect, an embodiment of this application discloses an order processing method, including:

receiving an order request sent by a user; the order request including an information of the required vehicle model set by the user;

selecting a target vehicle according to the order request to send order distribution information;

sending an operating state change instruction to the target vehicle if the required vehicle model set by the user is an online appointment vehicle model; wherein the operating state change instruction is configured to cause the target vehicle to change an operating state.

Further, the operating state change instruction is a roof light hiding instruction; sending the operating state change instruction to the target vehicle includes:

sending the roof light hiding instruction to the target vehicle, the roof light hiding instruction configured to cause the target vehicle to hide a roof light.

Further, the step of selecting the target vehicle to send the order distribution information according to the order request includes:

determining a set of to-be-received-order vehicles within a preset range of a riding location of the user according to the order request;

selecting the target vehicle from the set of to-be-received-order vehicles according to a set order distribution rule;

transmitting the order distribution information to the target vehicle.

Further, determining the set of to-be-received-order vehicles within the preset range of the riding location of the user according to the order request includes:

determining all operating vehicles that access an online appointment vehicle platform within the preset range of the riding location of the user, according to the order request;

among all the operating vehicles, determining the vehicles whose operating state is idle constitute the set of to-be-received-order vehicles.

Further, the set of to-be-received-order vehicles includes at least one to-be-received-order vehicle; selecting the target vehicle from the set of to-be-received-order vehicles according to the set order distribution rule includes:

obtaining a current location and a drivable distance of the to-be-received-order vehicle;

determining an order pre-estimated distance according to the current location, the riding location and a destination of the user;

determining the target vehicle according to the drivable distance and the order pre-estimated distance.

Further, after the sending the operating state change instruction to the target vehicle, the order processing method further includes:

receiving an order completion information sent by the target vehicle;

sending a roof light display instruction to the target vehicle according to the order completion information; the roof light display instruction configured to cause the target vehicle to display the hidden roof light.

Further, the method further includes.

sending a roof light display change instruction to the target vehicle if the required vehicle model set by the user is a cruise vehicle model; wherein the roof light display change instruction is configured to change a passenger carrying state displayed by the roof light of the target vehicle to a reserved passenger carrying state.

In a second aspect, an embodiment of the present application discloses an order processing apparatus, including:

a receiving module, receiving an order request sent by a user; the order request including an information of a required vehicle model set by the user;

an order distribution information sending module, configured to select a target vehicle to send order distribution information according to the order request;

an instruction sending module, configured to send an operating state change instruction to the target vehicle if the required vehicle model set by the user is an online appointment vehicle model; the operating state change instruction configured to cause the target vehicle to change an operating state.

In an optional embodiment, the operating state change instruction is a roof light hiding instruction; the instruction sending module includes:

a roof light hiding instruction sending unit, configured to send the roof light hiding instruction to the target vehicle, wherein the roof light hiding instruction is configured to enabling the target vehicle to hide the roof light.

In an alternative embodiment, the order distribution information sending module includes:

a to-be-received-order-vehicle set determining unit, configured to determine a set of to-be-received-order-vehicles within a preset range of a riding location of the user according to the order request;

a target vehicle selecting unit, configured to select the target vehicle from the set of to-be-received-order vehicles according to a set order distribution rule;

a transmission unit, configured to transmitting the order distribution information to the target vehicle.

In an alternative embodiment, the to-be-received-order-set determining unit includes:

an operating vehicle determining subunit, configured to determine all operating vehicles accessing the access an online appointment vehicle platform within the preset range of the riding location of the user according to the order request;

an idle vehicle determination subunit, configured to determine that vehicles whose operating state is idle constitute the set of to-be-received-order vehicles, among the all operating vehicles.

In an alternative embodiment, the set of to-be-received-order-vehicles includes at least one to-be-received-order-vehicle; the target vehicle selecting unit includes:

a location obtaining subunit, configured to obtain a current location and a drivable distance of the to-be-received-order vehicle;

a distance determining subunit, configured to determine an order pre-estimated distance according to the current location, the riding location and the destination of the user;

a target vehicle determining unit, configured to determine the target vehicle according to the drivable distance and the order pre-estimated distance.

In an alternative embodiment, the apparatus further includes:

an order completion information receiving module, configured to receive an order completion information sent by the target vehicle;

a roof light display instruction sending unit, configured to send a roof light display instruction to the target vehicle according to the order completion information; the roof light display instruction is for causing the target vehicle to display the hidden roof light.

In an alternative embodiment, the apparatus further includes:

a roof light display change instruction sending unit, configured to send a roof light display change instruction to the target vehicle if the required vehicle model set by the user is a cruise vehicle model; the roof light display change instruction is used for changing a passenger carrying state displayed by the roof light of the target vehicle to a reserved passenger carrying state.

In a third aspect, an embodiment of this application discloses an apparatus, and the apparatus includes a processor and a memory, wherein at least one instruction or at least one program is stored in the memory, and the at least one instruction or the at least one program is loaded by the processor and executes the order processing method described above.

In a fourth aspect, an embodiment of the present application discloses a computer readable storage medium, in which at least one instruction or at least one program is stored, and the at least one instruction or the at least one program is loaded and executed by a processor to implement the order processing method as described above.

The order processing method, the order processing apparatus, the server and the storage medium provided by the embodiments of the present application have the following technical effects:

the order processing method directly distributes an online appointment vehicle order of a user to a designated target vehicle, an instruction is sent to a target vehicle according to a required vehicle model set by a user when the user places an order, so that the target vehicle changes the operation state of the target vehicle, the actions of picking an order and refusing to accept an order by a cruising taxi driver are avoided, the traveling convenience of the user is ensured, the vehicle receiving the order can meet the requirements of the user, and the user experience is improved.

DESCRIPTION OF DRAWINGS

In order to more clearly illustrate the technical solutions and advantages in the embodiments of the present application or the prior art, a brief introduction of the drawings required to be used in the description of the embodiments or the prior art is presented below. It is obvious that the drawings described below are only some embodiments of the present application. Other drawings can also be obtained from these drawings.

EMBODIMENTS OF THE PRESENT APPLICATION

In combination with the accompanying drawings in the embodiments of the present application, the technical solutions in the embodiments of the present application are clearly and completely described. Obviously, the described embodiments are only a part of the embodiments of the present application, and not all the embodiments are based on the embodiments in the present application, all other embodiments obtained by those of ordinary skill in the art without creative efforts belong to the protection scope of the present application.

It should be noted that, the terms "first", "second" and the like in the description and claims of the present application and in the above-mentioned drawings are used to distinguish between similar objects, it should be understood that the data so used may be interchanged under appropriate circumstances, rather than being used to describe a particular sequence or precedence. So that the embodiments of the application described herein can be practiced in an order other than those illustrated or described herein, the terms "comprising" and "having" and any variations thereof, it is intended to cover a non-exclusive inclusion, e.g., a process, method, system, product, or server that includes a series of steps or elements, is not necessarily limited to those steps or elements that are expressly listed, but may include other steps or elements that are not expressly listed or are inherent to such process, method, product, or apparatus.

The online appointment vehicle is also called online appointment vehicle, the online appointment vehicle can be implemented by means of access online appointment vehicle platform to obtain single passenger-carrying. The cruising taxi, also called cruise vehicle, conventional cruising taxis accept passengers' recruitment by cruise on urban roads, to accept the offer of passengers. The online appointment vehicles can meet the needs of users in different travel scenarios, which can bring great convenience for users to travel. However, because the online appointment vehicle platform usually adopts the way to grab orders to distribute users' orders, there is a mismatch between the service supply and demand in the spatial and temporal distribution of online appointment vehicle booking, resulting in the demand for online appointment vehicle booking in some areas in some periods of time cannot be met, and there is an excess supply of online appointment vehicle booking capacity in some areas of other periods of time. The operation of cruising taxis is usually regulated by the government and subject to the government's scheduling and allocation of transport capacity resources, which can meet the public interests to the greatest extent. The existing cruising taxi can also receive orders through the access to the online appointment vehicle platform, but because the cruising taxi is usually a unified sample, it cannot meet the personalized needs of users. This application embodiment provides a two-car integration scheme based on the advantages of online appointment vehicle and cruising taxi.

Figure 1:
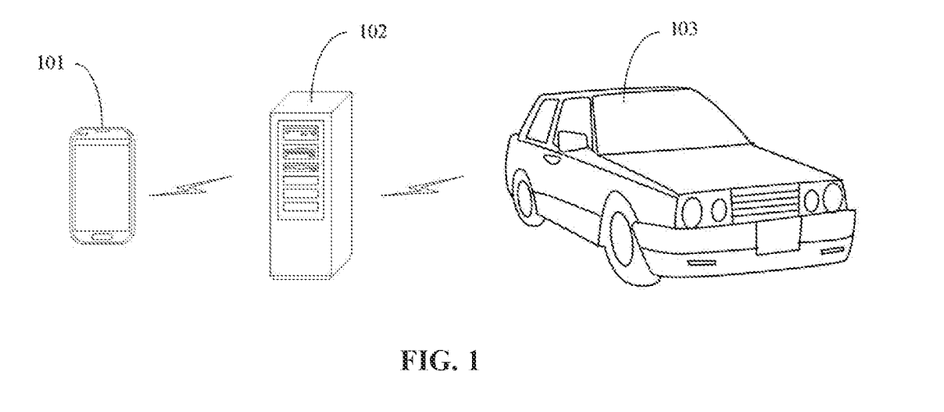
FIG. 1 is a schematic diagram of an application environment of an order processing method according to an embodiment of this application.

Please refer to FIG. 1. FIG. 1 is a schematic diagram of an application environment of an order processing method provided by an embodiment of this application. As shown in FIG. 1, the application environment may include a user terminal 101, a server 102, and a vehicle terminal 103.

In this application embodiment, the user sends an online vehicle appointment order through the user terminal 101. Optionally, user terminals 101 may include, but are not limited to, smartphones, desktop computers, tablets, laptops, smart speakers, digital assistants, augmented reality (AR)/virtual reality (VR) devices, smart wear-ables and other types of electronic devices. It can also be software that runs on the above electronic devices, such as applications, small programs, etc. Optionally, the operating systems running on the device may include, but are not limited to, Android, IOS, Linux, Windows, Unix, etc.

In this application embodiment, server 102 is used to receive the order information sent by the user terminal 101 and send the order information to the specified vehicle terminal 103. Optionally, server 102 can be the background server of the online appointment vehicle platform. Optionally, server 102 can be an independent physical server, a server cluster consisting of multiple physical servers, or a distributed system. It can also be a cloud server that provides cloud services, cloud databases, cloud computing, cloud functions, cloud storage, Online services, cloud communications, middleware services, domain name services, security services, CDN (Content Delivery Online), and big data and artificial intelligence platforms and other basic cloud computing services.

In this application embodiment, vehicle terminal 103 is a remote communication terminal arranged on the vehicle. The vehicle terminal 103 can receive information and instructions sent by the server 102, and in some cases can control the vehicle device according to the instructions sent by the server 102. The vehicle refers to the vehicle that is connected to the online appointment vehicle platform and can provide online appointment vehicle services. Different from the cruising taxi and online appointment vehicle in the prior art, the vehicle in the embodiment of this application is a dual-purpose vehicle that can act as both a cruising taxi and an online appointment vehicle. In the actual operation process, the vehicle can not only cruise on the city road to accept passenger orders on the roadside, but also access the online appointment vehicle platform, according to the needs of users to transform into an online appointment vehicle to accept online orders.

In addition, it should be noted that FIG. 1 is only an application environment of the order processing method provided herein. In practical applications, the user terminal 101 can be the user client of the registered online appointment vehicle platform, and the vehicle terminal 103 can be the vehicle accessing the online appointment vehicle platform. The number of user terminal 101 and vehicle terminal 103 can be many. The one user terminal 101 and one vehicle terminal 103 shown in FIG. 1 do not qualify this application.

Figure 2:
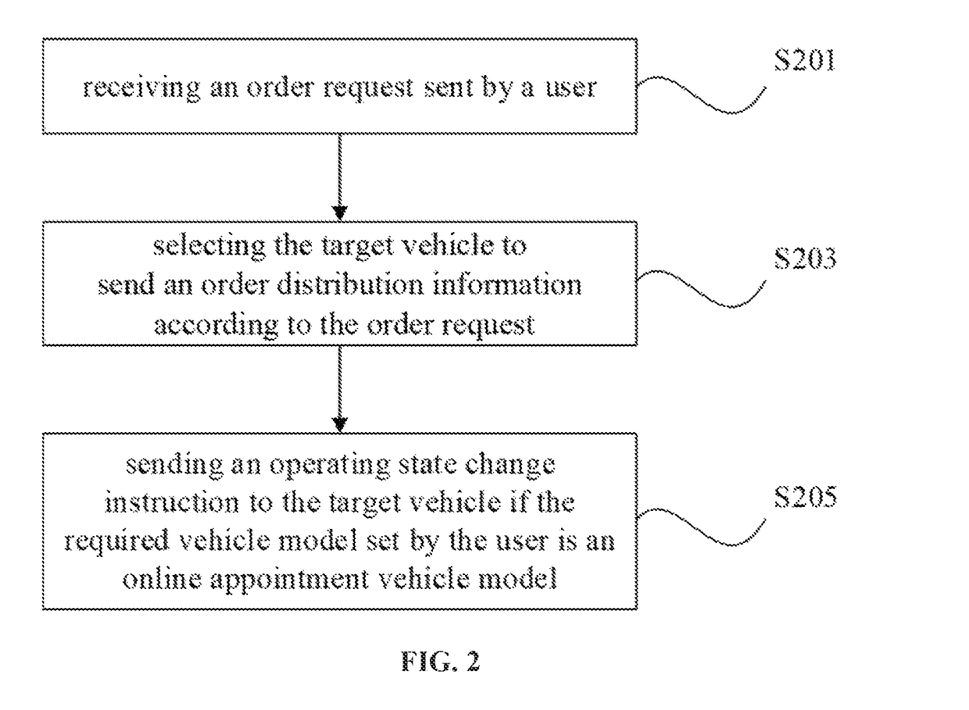
FIG. 2 is a schematic flowchart of an order processing method according to an embodiment of the present disclosure.

The following is a specific embodiment of an order processing method in this application. FIG. 2 is a flow diagram of an order processing method provided in this application embodiment. This specification provides the operation steps of the method such as embodiments or flow charts, but it may include more or less operation steps based on routine or uncreative labor. The sequence of steps listed in the embodiments is only one way in which the sequence of steps is executed, and does not represent a unique sequence of execution. In the actual system or server product execution, it can be executed sequentially or in parallel according to the embodiments or the methods shown in the attached drawings (such as parallel processor or multi-threaded processing environment). As shown in FIG. 2, the method is applied to a server and can include the following steps:

S201: receiving an order request sent by a user.

In this application embodiment, when the user needs to book an online appointment vehicle for going out, the user sends an order request to the server through the user terminal held by the user. The order request includes information about the required vehicle model set by the user. The required vehicle model refers to the required vehicle model of the user, including online appointment vehicle and cruising taxi.

S203: selecting the target vehicle to send an order distribution information according to the order request.

In this application embodiment, after the server receives the order request sent by the user terminal, according to the order information contained in the order request, the target vehicle is selected among the vehicles connected to the online appointment vehicle platform to distribute the user's order.

S205: sending an operating state change instruction to the target vehicle if the required vehicle model set by the user is an online appointment vehicle model.

In this application embodiment, after determining the target vehicle, the server controls the vehicle according to the required vehicle model set in the user's order request to ensure that the model meets the user's needs. When the server determines that the required vehicle model set by the user is the online appointment vehicle model, the server will send the operating state change instruction to the target vehicle. The operating state change instruction is used to change the operational state of the target vehicle.

Figure 3:
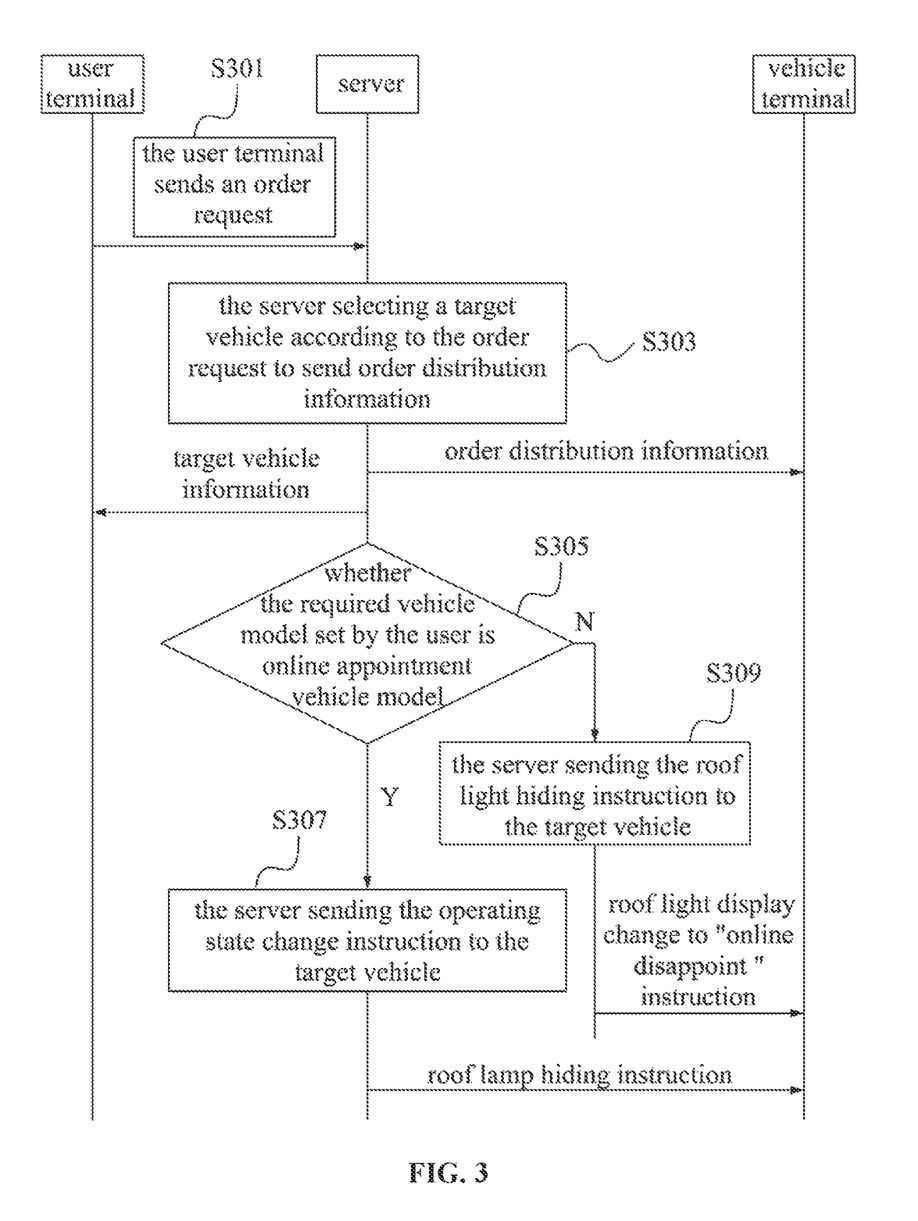
FIG. 3 is a schematic interactive flow diagram of an order processing method according to an embodiment of the present disclosure.

Based on the above order processing method applied to the server, the following describes the specific interaction process of the server to execute the order processing method. FIG. 3 is a schematic diagram of the interaction flow of an order processing method provided by this application embodiment. As shown in FIG. 3, the interaction sides of the order processing method are user terminal, server and vehicle terminal respectively, including the following steps:

S301: the user terminal sending an order request.

In this application embodiment, before using the user terminal for online appointment vehicle booking, the user interacts with the server through the user terminal, submits identity verification information to complete account registration, and then conducts online appointment vehicle booking on the online appointment vehicle platform by logging in the account. When the user needs to book an online appointment vehicle, the user sends an order request to the server through the user terminal it holds. In addition to the basic information of the order such as the departure, destination and time of the ride, the order request also includes the information of the required vehicle model set by the user. The required vehicle model refers to the type of vehicle the user needs, which is mainly divided into online appointment vehicle and cruising taxi. The online appointment vehicle referred to here refers to a vehicle with a common private vehicle shape, and the cruising taxi refers to a vehicle with the same shape as the cruising taxi visible on the ordinary road. In some scenarios, such as when the user attends a business occasion, it is obviously more appropriate to arrive at the destination by online appointment vehicle booking. For example, in some cities, the cost of online appointment vehicle booking is cheaper than that of cruising taxis, and users are more inclined to use online appointment vehicle booking to travel. For another example, some users will think that the cruising taxi is safer and more inclined to use the cruising taxi to travel. Based on the above scenario, the user will pre-set the required vehicle model when sending the order request. In the existing technology, it is obviously only possible to match the corresponding model for the user according to the required vehicle model set by the user. That is, if the required vehicle model set by the user is an online appointment vehicle model, the online appointment vehicle platform can only match the user with the online appointment vehicle; if the required vehicle model set by the user is a cruising taxi model, the online appointment vehicle platform can only match the user with the cruising taxi. In the embodiment of this application, since the vehicle connected to the online appointment vehicle platform is a dual-use integrated vehicle, the vehicle can act as both an online appointment vehicle and a cruising vehicle. Therefore, when the user's order is assigned to the vehicle, according to the required model set by the user, the vehicle shape can be changed by controlling the action of the on-board device, so that the shape of the vehicle is presented as a cruising taxi or an online appointment vehicle.

It should be noted that although the vehicle in this application can act as both an online appointment vehicle and a cruising taxi, the vehicles accessing the online appointment vehicle hailing platform are not limited to the above-mentioned dual-purpose vehicles, but can also access ordinary online appointment vehicle and a cruising taxi at the same time. In some embodiments, the dual-purpose vehicle can also be used as a supplement to the online appointment vehicle or cruising taxi, and when the capacity of the required model set by the user is insufficient, the dual-purpose model can be matched as a supplement to the capacity.

In this application embodiment, the user terminal sends an order request to the server, and correspondingly, the server receives the order request sent by the user. The server performs further processing based on the information set by the user for the required vehicle model included in the order request.

S303: the server selecting the target vehicle to send an order information according to the order request.

In this application embodiment, after the server receives the order request sent by the user terminal, according to the order information contained in the order request, the target vehicle is selected from the vehicles connected to the online appointment vehicle platform to undertake the order. In some scenarios, such as a business circle in the travel peak hours, in a period of time, multiple users at the same time to the online appointment vehicle platform to issue orders, if it is through the driver to grab orders to distribute orders, it is bound to cause the travel distance of a long order is received, and the travel distance of the order no one wants to. In this application embodiment, the server directly selects the target vehicle to send the order, instead of sending the order by the driver of the cruising taxi, which can effectively avoid the behavior of the driver to pick up the order and refuse the load.

Figure 4:
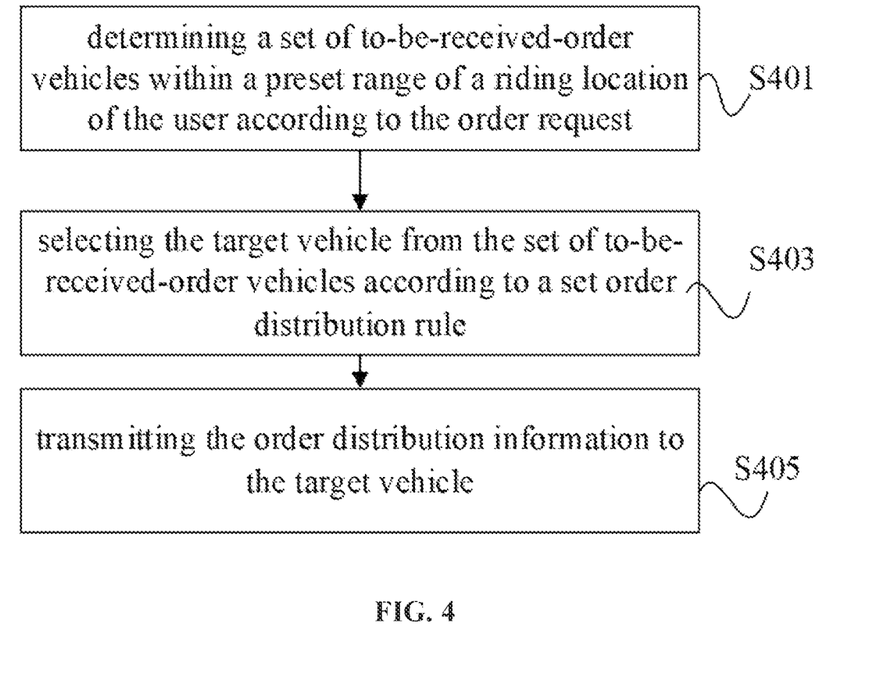
FIG. 4 is a schematic flowchart of a method for selecting a target vehicle to send order distribution information according to an order request according to an embodiment of the present disclosure.

In this application embodiment, the server selects the target vehicle and distributes the order according to the vehicle preference information in the order information and the order distribution rules of the online appointment vehicle platform. FIG. 4 is a schematic diagram of the process of selecting the target vehicle to send order information according to the order request provided by this application embodiment, as shown in FIG. 4, selecting the target vehicle to send order information according to the order request includes:

S401: determining the set of to-be-received-order vehicles within the preset range of a riding location of the user according to the order request.

In this application embodiment, the server first obtains the user's riding location from the order information contained in the order request, and then determines the vehicles that can undertake the order within a certain distance from the user's riding location to constitute the set of to-be-received-order vehicles. As an optional embodiment, the server determines the set of to-be-received-order vehicles within the preset range of the user's riding location according to the order request. First, the server needs to determine all the operating vehicles that access the online appointment vehicle platform within the preset range of the user's riding location according to the order request. Then, the server determines the idle vehicles in all operating vehicles to constitute the set of to-be-received-order vehicle. There may be multiple vehicles connected to the online appointment vehicle platform near the user's riding location, and the operating states in these vehicles include idle state, passenger state and stopped operation state. A vehicle with an idle operating state will be displayed on the online appointment vehicle platform corresponding to the vehicle waiting for an order. There are two types of vehicles in the operating state to carry passengers, one is completing the order issued by the online appointment vehicle platform, at which time the server will have the corresponding record information. The other is when the vehicle is cruising on the road to accept passenger pick-up orders. Empty vehicles can accept orders, after the start of the service to the online appointment vehicle platform, it will report the order signal immediately, and the server will record the vehicle as carrying passenger status. In general, if the vehicle is in the state of carrying passengers, the online appointment vehicle platform will no longer send online appointment orders to the vehicle. In some embodiments, the vehicle in the state of carrying passengers can also estimate the end time of the order according to its trip information, route information, etc., when the end time of the order is within the preset range, the online appointment vehicle platform can also distribute the order in advance. Vehicles whose operating state is stopped are also recorded in the server, and the server filters them out when determining the set of to-be-received-order vehicles.

It should be noted that for some pure electric vehicles that access the online appointment vehicle platform, when the vehicle is charging, it can also be set to the idle state to wait for the online order, so as to achieve uninterrupted parking and improve the driver's order rate.

In some scenarios, such as peak travel times, there may be no to-be-received-order vehicles with idle operating state near the user's riding location. At this point, the scope of screening can be expanded to cover more vehicles. Of course, for drivers who receive orders from a distance, the online appointment vehicle platform can also specify certain incentive measures to improve the driver's enthusiasm for receiving orders. In addition to the above measures, the server can also schedule vehicles based on the number of orders for a preset period of time in an area compared with the number of available vehicles. As an optional embodiment, the server first determines the number of orders sent by users in the preset area within a preset period of time, and then obtains the number of vehicles in the preset area whose operating state is idle. If the number of vehicles is less than or equal to the number of orders, it sends scheduling information to all operating vehicles in the access online appointment vehicle platform. Scheduling information can be enforcement information for certain vehicles, or it can be guided broadcast information to get vehicles to a predetermined area and increase the number of vehicles that can receive orders in that area.

S403: selecting the target vehicle from the set of to-be-received-order vehicles according to a set order distribution rule.

In this application embodiment, the server selects the target vehicle in the collection of vehicles to be received according to the order distribution rule set by the platform. As an optional embodiment, the set of to-be-received-order vehicle includes at least one to-be-received-order vehicle. The server selects the target vehicle from the set of to-be-received-order vehicle according to the set order distribution rules, including: obtaining the current location and drivable distance of the vehicle to be received. The order pre-estimated distance is determined based on the current location, the riding location and the destination of the user. Determine the target vehicle based on the drivable distance and the order pre-estimated distance. Specifically, the server monitors the running status of the vehicle in real time. When the server selects the target vehicle for ordering, it first determines the drivable distance of the vehicle. For example, the battery shortage of pure electric vehicles on the way to complete the order will bring a bad experience to the user. Therefore, when the remaining power of the vehicle is not enough to support long-distance orders, the vehicle cannot be selected to undertake long-distance orders. The server calculates the distance that each vehicle in the collection needs to travel to complete the order according to the current location of the vehicle, the user's driving place and the destination. By comparing with the respective drivable distance of the vehicle, the vehicle that can complete the order is determined as the target vehicle.

In some embodiments, under the premise of ensuring that the drivable distance of the vehicle can complete the order, the server selects the vehicle according to the preference information set in the user's order request, such as requiring the driver to receive orders, service score, driving age, etc., which is greater than the preset value, so as to obtain the target vehicle that meets the user's expectations. In other embodiments, the server can also send information about available vehicles to the user terminal, and the user can choose the vehicle to undertake the order.

S405: sending the order information to the target vehicle.

In this application embodiment, after the server determines the target vehicle, it sends the order information to the target vehicle, notifies the driver to complete the order, and sends the information of the target vehicle to the user terminal to remind the user.

S305: the server determining whether the required vehicle set by the user is an online appointment vehicle model.

In this application embodiment, after determining the target vehicle, the server controls the vehicle according to the required vehicle model set in the user's order request to ensure that the model meets the user's needs. Optionally, the server determines whether the required vehicle model set by the user is an online appointment vehicle model, if it is, then perform step S307, if not, then go to step S309.

It should be noted that the above judgment process for required vehicle model set by the user is for the online appointment and cruise dual-purpose vehicles. For ordinary online appointment vehicles and cruising taxis, the online appointment vehicle platform can directly determine the set of to-be-received-order vehicle of the corresponding model according to the required vehicle model set by the user when determining the set of to-be-received-order vehicle. As an example, if the required vehicle model set by the user is an online appointment vehicle, the server needs to determine all the operating online appointment vehicles that access the online appointment platform within the preset range of the user's riding location according to the order request. Then, the server determines that the operating state of the online appointment vehicle is idle in all the online appointment vehicle to constitute the set of to-be-received-order vehicle.

S307: the server sending operating state change instructions to the target vehicle.

In this application embodiment, when the server determines that the required vehicle model set by the user is an online appointment vehicle, the server will send an operating state change instruction to the target vehicle. The operating state change instruction is used to change the operating state of the target vehicle. Optionally, an operating state change order can be sent to the target vehicle at the same time as the order distribution information. Optionally, the operating state change instruction can be sent to the target vehicle after the order distribution information is sent to the vehicle terminal. In some embodiments, the operating state change instruction can also be included in the order distribution information, that is, the order sending information carries the operating state change instruction, and after receiving the order distribution information, the vehicle terminal can obtain the operating state change instruction by analyzing the order distribution information. The vehicle is equipped with an on-board device to mark the operating state of the vehicle, which can also be a device to distinguish the online appointment vehicle and the cruising taxi, such as the roof light. Generally speaking, the main difference between the online appointment vehicle and the cruising taxi in terms of appearance is that the top of the body of the cruising taxi is set up with a roof light for displaying the operating state, while the top of the body of the online appointment vehicle has no roof light. In an optional embodiment, the operational state change instruction is the roof light hiding instruction, the server sends the roof light hiding instruction to the target vehicle, and after receiving the roof light hiding instruction, the vehicle terminal in the target vehicle controls the target vehicle hide the roof light. As an optional implementation, the roof light of the target vehicle is installed on the vehicle body through the lifting mechanism, and when the vehicle terminal receives the roof light hiding instruction, the lifting mechanism is controlled to lift, and then the roof light is driven down, so that the roof light is hidden in the body. As another alternative implementation, the roof light of the target vehicle is installed on the body through the folding mechanism, and when the vehicle terminal receives the hiding instruction of the roof light, the folding mechanism is controlled to drive the roof light to turn over, so that the roof light is hidden inside the body.

It should be understood that the on-board device is a roof light only as an optional embodiment, and the on-board device used in the implementation of this application to distinguish the device of the online appointment vehicle from the cruising taxi is not limited to the roof light, but may also be other on-board devices. For example, the two sides of the vehicle door is set with a sign of the vehicle type of the display screen, the display screen can display the vehicle's passenger status, when the vehicle terminal receives the operating state change instruction, by changing the display content on the display screen, such as the same color as the body, so that the appearance of the vehicle is consistent with the online appointment vehicle.

S309: the server sending a roof light display change instruction to the target vehicle.

In this application embodiment, when the server determines that the required model set by the user is not an online appointment vehicle model, that is, when the server determines that the required model set by the user is a cruising taxi model, the server will send instructions to the target vehicle to change the display of the roof light. The roof light display change instruction is used to change the passenger status displayed on the roof light of the target vehicle to the reserved passenger carrying status. Under normal circumstances, the vehicle is used as a cruising taxi on the road to accept the passenger's recruitment order, while waiting to accept the online appointment vehicle platform to send the online appointment order. The overhead light on the vehicle is used to show the carrying passenger state of the vehicle. As an example, the carrying passenger state of the vehicle displayed on the roof light can include the status of "empty", "carrying passengers", "online appointment", etc. Passengers who make a call at the side of the road can know the carrying passenger status of the vehicle by observing the words displayed on the roof light. When the server determines that the required vehicle set by the user is the cruise vehicle model, the server will send the instruction to the target vehicle to change the roof light display to "online appointment". In some embodiments, the roof light is not limited to indicating the passenger carrying passenger state of the vehicle by displaying words, but can also indicate the passenger carrying passenger status of the vehicle by displaying different colors. For example, by displaying green, the vehicle is idle, by displaying red, the vehicle is in the state of carrying passengers, and by displaying yellow, the vehicle is in the state of online appointment. The server changes the offline operating state of the vehicle when the vehicle accepts the online appointment order by sending the change instruction of the roof light to the target vehicle, so as to avoid the misunderstanding of the offline passengers. Moreover, the carry passenger state of the vehicle is recorded on the server, achieving the unity of the actual operating carrying passenger status of the vehicle online and offline. The server is convenient to send orders to the vehicle according to the actual carrying passenger state of the vehicle, reducing the error of distribution orders.

In this application embodiment, when the vehicle completes the current order, it sends the order completion information to the server through the vehicle terminal to enter the state of waiting for the order again. As an optional embodiment, the server receives the order completion information sent by the vehicle terminal on the target vehicle. The server sends the roof light display instruction to the target vehicle according to the order completion information, which is used to make the target vehicle display the hidden roof light. When the vehicle terminal sends the order completion information to the server, the server learns that the target vehicle has completed the previous order, and then matches the order for the vehicle again according to the vehicle location. Or vehicles cruise the road by displaying overhead lights to receive pickup orders. Optionally, the order completion information sent by the vehicle terminal to the server includes audio and video data, order data and other information during the completion of the order.

The order processing method described in this application example can meet the needs of users in different travel scenarios and bring great convenience to users' travel.

Figure 5:
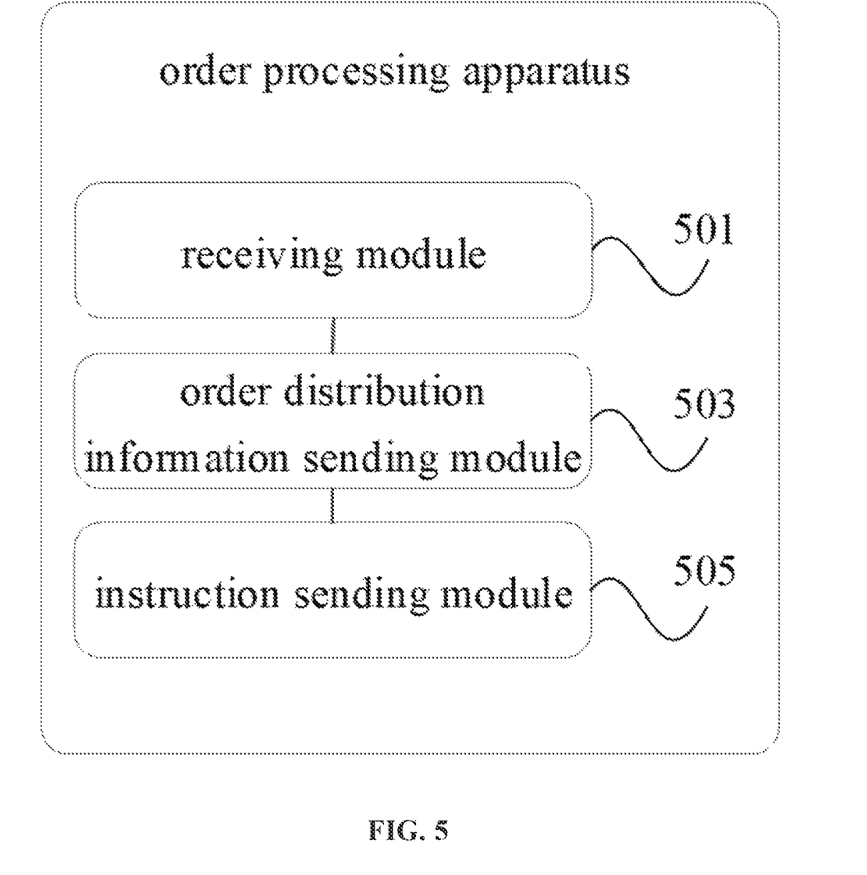
FIG. 5 is a schematic structural diagram of an order processing apparatus according to an embodiment of this application.

This application embodiment also provides an order processing apparatus. FIG. 5 is a structural diagram of an order processing apparatus provided by this application embodiment, as shown in FIG. 5. The apparatus includes:

a receiving module 501, receiving an order request sent by a user; the order request including information a required vehicle model set by the user;

an order distribution information sending module 503, configured to select a target vehicle to send order distribution information according to the order request;

an instruction sending module 505, configured to send the operating state change instruction to the target vehicle if the required vehicle model set by the user is the online appointment vehicle model; the operating state change instruction configured to cause the target vehicle to change an operating state.

In one optional embodiment, the operating state change instruction is the roof light hiding instruction; the instruction sending module 505 includes:

a roof light hiding instruction sending unit, configured to send the roof light hiding instruction to the target vehicle, wherein the roof light hiding instruction is configured to enabling the target vehicle to hide the roof light;

In an optional embodiment, the order distribution information sending module 503 includes:

a to-be-received-order-vehicle set determining unit, configured to determine a set of to-be-received-order-vehicles within a preset range of a riding location of the user according to the order request;

a target vehicle selecting unit, configured to select the target vehicle from the set of to-be-received-order vehicles according to a set order distribution rule;

a transmission unit, configured to transmitting the order distribution information to the target vehicle.

In an optional embodiment, the to-be-received-order-set determining unit includes:

an operating vehicle determining subunit, configured to determine all operating vehicles accessing the access an online appointment vehicle platform within the preset range of the riding location of the user according to the order request;

an idle vehicle determination subunit, configured to determine that vehicles whose operating state is idle constitute the set of to-be-received-order vehicles, among the all operating vehicles.

the set of to-be-received-order-vehicles includes at least one to-be-received-order-vehicle;

the target vehicle selecting unit includes:

a location obtaining subunit, configured to obtain a current location and a drivable distance of the to-be-received-order vehicle;

a distance determining subunit, configured to determine an order pre-estimated distance according to the current location, the riding location and the destination of the user;

a target vehicle determining unit, configured to determine the target vehicle according to the drivable distance and the order pre-estimated distance.

In an alternative embodiment, the apparatus further includes:

an order completion information receiving module, configured to receive an order completion information sent by the target vehicle;

a roof light display instruction sending unit, configured to send a roof light display instruction to the target vehicle according to the order completion information; the roof light display instruction is for causing the target vehicle to display the hidden roof light.

In an alternative embodiment, the apparatus further includes:

a roof light display change instruction sending unit, configured to send a roof light display change instruction to the target vehicle if the required vehicle model set by the user is a cruise vehicle model; the roof light display change instruction is used for changing a passenger carrying state displayed by the roof light of the target vehicle to a reserved passenger carrying state.

The apparatus and method embodiments in this application are based on the same application idea.

Figure 6:
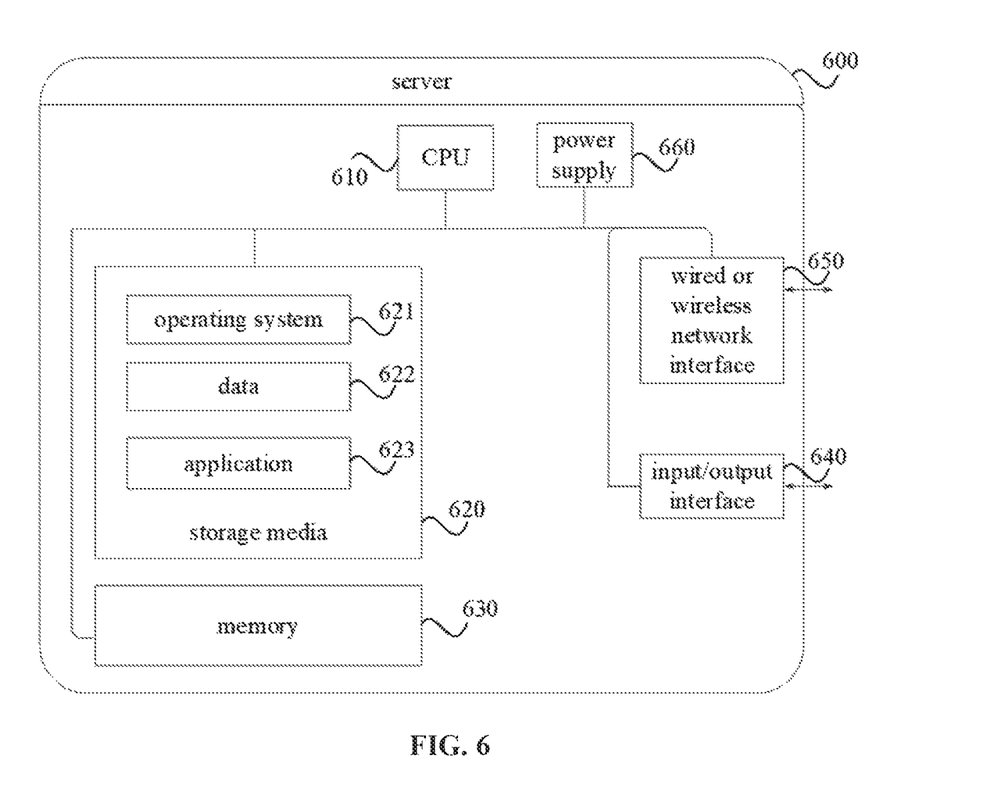
FIG. 6 is a block diagram of a hardware structure of a server of an order processing method according to an embodiment of the present disclosure.

The method embodiments provided in this application may be executed in a computer terminal, server, or similar computing apparatus. Taking running on a server as an example, FIG. 6 is the hardware structure block diagram of a server for an order processing method provided by this application embodiment. As shown in FIG. 6, the server 600 can vary considerably depending on configuration or performance, and can include one or more Central Processing Units (CPU) 610 (the processor 610 may include, but is not limited to, a processing apparatus such as a microprocessor MCU or programmable logic apparatus FPGA), a memory for storing data 630, a storage medium 620 for storing one or more applications 623 or data 622 (for example, one or more mass storage apparatus). Wherein, the memory 630 and the storage medium 620. May be temporary or persistent storage. The program stored in the storage medium 620 may consist of one or more modules, each module may consist of a series of instruction operations on the server. Further, the CPU 610 can be set up to communicate with the storage medium 620 to perform a series of command operations in the storage medium 620 on the server 600. Server 600 can also include one or more than one power supply 660, one or more than one wired or wireless network interface, 650 a, 640, or more than one input/output interface, and/or one or more than one operating system 621, for example, Windows Server™ Mac OS X™, Unix™, Linux™, FreeBSD™ and so on.

The input/output interface 640 can be used to receive or send data over a network. The above network concrete example may include a wireless network provided by the communication provider of server 600. In one example, the input/output Interface 640 includes a Network Interface Controller (NIC) that can communicate with the Internet by connecting to other network apparatus via a base station. In one example, the input/output interface 640 can be a Radio Frequency (RF) module, which is used to communicate wirelessly with the Internet.

It may be understood by persons of ordinary skill in the art that the structure shown in FIG. 6 is only indicative and does not limit the structure of the said electronic apparatus. For example, the server 600 could also include more or fewer components than shown in FIG. 6, or have a different configuration than shown in FIG. 6.

Embodiments of the present application also provide a computer-readable storage medium in which at least one instruction or at least one program is stored and at least one instruction or at least one program is loaded and executed by the processor to implement the order processing method described above.

Optionally, in this embodiment, the storage medium may be located on at least one of the multiple network servers of the computer network. Optionally, in this embodiment, the storage media may include, but are not limited to, USB flash drives, Read-Only Memory (ROM), Random Access Memory (RAM), portable hard disks, magnetic disks, or optical disks, and other media that can store program code.

The order processing method described in this application example can meet the needs of users in different travel scenarios and bring great convenience to users' travel. The order processing method sends the user's online appointment vehicle order directly to the designated target vehicle, and sends instructions to the target vehicle according to the required vehicle model set by the user when placing the order, so that the target vehicle can change its own operating state, which not only avoids the behavior of the cruising taxi driver, but also ensures the user's travel convenience. It also ensures that the vehicle receiving the order can meet the needs of the user and improve the user experience. By unifying the online and offline operating state of vehicles, the order acceptance rate of vehicles is improved.

It should be noted that the above order of embodiments in this application is only for description and does not represent the merits of embodiments. Specific embodiments of this specification are described above. Other embodiments are within the scope of the attached claims. In some cases, the actions or steps described in the claim may be performed in a different order than in the embodiment and still achieve the desired result. In addition, the process depicted in the accompanying diagram does not necessarily require a specific sequence or sequential sequence to achieve the desired result. In some embodiments, multitasking and parallel processing are also possible or may be advantageous.

Each embodiment in this specification is described in a progressive manner, and the same and similar parts of each embodiment can be referred to each other. Each embodiment focuses on the differences from other embodiments. In particular, for the apparatus embodiments, the description is relatively simple because it is basically similar to the method embodiments, and the relevant points can be referred to the partial description of the method embodiments.

A person of ordinary skill in the art may understand that all or part of the steps to achieve the above embodiments may be performed by hardware or by a program instructing the relevant hardware, and that the program may be stored in a computer readable storage medium, such as read-only memory, disk or optical disc.

The above is only a better embodiment of this application and is not intended to limit this application. Any modification, equivalent replacement, improvement, etc. made within the spirit and principles of this application shall be covered by this application.

What is claimed is:

1. An order processing method, characterized in that, applied to an apparatus, the method comprises:
   receiving an order request sent by a user; the order request comprising an information of a required vehicle model set by the user;
   selecting a target vehicle according to the order request to send an order distribution information, wherein the target vehicle is a dual-purpose vehicle that can act as both a cruising taxi and an online appointment vehicle, and the target vehicle is equipped with a roof light to mark the operating state of the vehicle, and to distinguish the online appointment vehicle and the cruising taxi vehicle;
   sending a roof light hiding instruction to the target vehicle when the required vehicle model set by the user is an online appointment vehicle model; wherein the roof light hiding instruction is sent to a vehicle terminal in the target vehicle to cause a lifting mechanism of the target vehicle to lift and hide a roof light inside a body of the target vehicle;
   sending a roof light display change instruction to the target vehicle when the required vehicle model set by the user is a cruise vehicle model; wherein the roof light display change instruction controls the vehicle terminal in the target vehicle to display the roof light on top of the body of the target vehicle and change a passenger carrying state displayed by the roof light of the target vehicle to a reserved passenger carrying state on the roof light.

2. The order processing method according to claim 1, characterized in that, selecting the target vehicle according to the order request to send order distribution information comprises:
   determining a set of to-be-received-order vehicles within a preset range of a riding location of the user according to the order request;
   selecting the target vehicle from the set of to-be-received-order vehicles according to a set order distribution rule;
   transmitting the order distribution information to the target vehicle.

3. The order processing method according to claim 2, characterized in that, determining the set of to-be-received-order vehicles within the preset range of the riding location of the user according to the order request comprises:
   determining all operating vehicles that access an online appointment vehicle platform within the preset range of the riding location of the user, according to the order request;
   among all the operating vehicles, determining the vehicles whose operating state is idle constitute the set of to-be-received-order vehicles.

4. The order processing method according to claim 3, characterized in that, the set of to-be-received-order vehicles comprises at least one to-be-received-order vehicle; selecting the target vehicle from the set of to-be-received-order vehicles according to the set order distribution rule comprises:
   obtaining a current location and a drivable distance of the to-be-received-order vehicle;
   determining an order pre-estimated distance according to the current location, the riding location and a destination of the user;
   determining the target vehicle according to the drivable distance and the order pre-estimated distance.

5. The order processing method according to claim 1, characterized in that, after the sending the roof light hiding instruction to the target vehicle, the order processing method further comprises:
   receiving an order completion information sent by the target vehicle;
   sending a roof light display instruction to the target vehicle according to the order completion information; the roof light display instruction configured to cause the target vehicle to display the hidden roof light.

6. An apparatus, characterized in that, the apparatus comprises a processor and a memory, in the memory at least one instruction or at least one program is stored, the at least one instruction or the at least one program implements the order processing method according to claim 1.

7. A non-transitory computer readable storage medium, characterized in that, the storage medium stored therein at least one instruction or at least one program, the at least one instruction or at least one program implements the order processing method as claimed in claim 1.

8. The apparatus according to claim 6, characterized in that, the apparatus is a server.

9. The apparatus according to claim 6, the operating state change instruction is a roof light hiding instruction; sending the operating state change instruction to the target vehicle comprises:
   sending the roof light hiding instruction to the target vehicle, the roof light hiding instruction configured to cause the target vehicle to hide a roof light.

10. The apparatus according to claim 6, characterized in that, selecting the target vehicle according to the order request to send order distribution information comprises:

determining a set of to-be-received-order vehicles within a preset range of a riding location of the user according to the order request;

selecting the target vehicle from the set of to-be-received-order vehicles according to a set order distribution rule;

transmitting the order distribution information to the target vehicle.

11. The apparatus according to claim 10, determining the set of to-be-received-order vehicles within the preset range of the riding location of the user according to the order request comprises:

determining all operating vehicles that access an online appointment vehicle platform within the preset range of the riding location of the user, according to the order request;

among all the operating vehicles, determining the vehicles whose operating state is idle constitute the set of to-be-received-order vehicles.

12. The apparatus according to claim 11, characterized in that, the set of to-be-received-order vehicles comprises at least one to-be-received-order vehicle; selecting the target vehicle from the set of to-be-received-order vehicles according to the set order distribution rule comprises:

obtaining a current location and a drivable distance of the to-be-received-order vehicle;

determining an order pre-estimated distance according to the current location, the riding location and a destination of the user;

determining the target vehicle according to the drivable distance and the order pre-estimated distance.

13. The apparatus according to claim 6, after the sending the operating state change instruction to the target vehicle, the order processing method further comprises:

receiving an order completion information sent by the target vehicle;

sending a roof light display instruction to the target vehicle according to the order completion information; the roof light display instruction configured to cause the target vehicle to display the hidden roof light.

14. The apparatus according to claim 6, the method further comprises:

sending a roof light display change instruction to the target vehicle if the required vehicle model set by the user is a cruise vehicle model; wherein the roof light display change instruction is configured to change a passenger carrying state displayed by the roof light of the target vehicle to a reserved passenger carrying state.

* * * * *